(12) United States Patent  
Kobayashi et al.

(10) Patent No.: US 8,614,840 B2
(45) Date of Patent: Dec. 24, 2013

(54) IMAGE READING APPARATUS (75) Inventors: Ken Kobayashi, Kanagawa (JP); Yuichi Mikuni, Kanagawa (JP); Mitsuo Shimizu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 304 days.

(21) Appl. No.: 13/089,930

(22) Filed: Apr. 19, 2011

(65) Prior Publication Data

US 2012/0113484 A1 May 10, 2012

(30) Foreign Application Priority Data

Nov. 8, 2010 (JP) .................................. 2010-249934

(51) Int. Cl.
*H04N 1/04* (2006.01)
*B65H 7/02* (2006.01)
*B65H 1/00* (2006.01)

(52) U.S. Cl.
USPC ...... 358/475; 358/498; 358/488; 271/265.01; 271/171

(58) Field of Classification Search
USPC ......................................... 358/475, 498, 488
See application file for complete search history.

(56) References Cited

U.S. PATENT DOCUMENTS

| | | | |
|---|---|---|---|
| 8,042,802 B2* | 10/2011 | Shiraishi et al. | 271/171 |
| 2001/0032927 A1 | 10/2001 | Fukazawa et al. | |
| 2002/0036809 A1* | 3/2002 | Tohyama et al. | 358/498 |
| 2003/0161012 A1* | 8/2003 | Kusunose | 358/498 |
| 2009/0251743 A1* | 10/2009 | Taniguchi | 358/498 |
| 2010/0201064 A1* | 8/2010 | Shiraishi et al. | 271/265.01 |
| 2010/0225983 A1* | 9/2010 | Fujii et al. | 358/498 |

FOREIGN PATENT DOCUMENTS

JP   2000-174956 A   6/2000

* cited by examiner

*Primary Examiner* — Charlotte M Baker
*Assistant Examiner* — Rury Grisham
(74) *Attorney, Agent, or Firm* — Sughrue Mion, PLLC (57) ABSTRACT An image reading apparatus includes an image reading member disposed in one of two regions that face each other with a transport path of a document therebetween, the image reading member being used for reading an image on the document, the image reading member including a light-receiving portion, a light-collecting member that collects reflected light reflected from the document onto the light-receiving portion, and a protruding portion that protrudes toward the transport path; and an opposing member disposed in the other of the two regions, the opposing member having a recess formed therein, the recess allowing the protruding portion of the image reading member to enter thereinto, the opposing member being disposed opposite the image reading member with the transport path therebetween.

17 Claims, 7 Drawing Sheets

IMAGE READING APPARATUS

CROSS-REFERENCE TO RELATED APPLICATIONS

This application is based on and claims priority under 35 USC 119 from Japanese Patent Application No. 2010-249934 filed Nov. 8, 2010.

BACKGROUND

Technical Field

The present invention relates to an image reading apparatus.

SUMMARY

According to an aspect of the invention, an image reading apparatus includes an image reading member disposed in one of two regions that face each other with a transport path of a document therebetween, the image reading member being used for reading an image on the document, the image reading member including a light-receiving portion, a light-collecting member that collects reflected light reflected from the document onto the light-receiving portion, and a protruding portion that protrudes toward the transport path; and an opposing member disposed in the other of the two regions, the opposing member having a recess formed therein, the recess allowing the protruding portion of the image reading member to enter thereinto, the opposing member being disposed opposite the image reading member with the transport path therebetween.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described with reference to the drawings.

Figure 1:
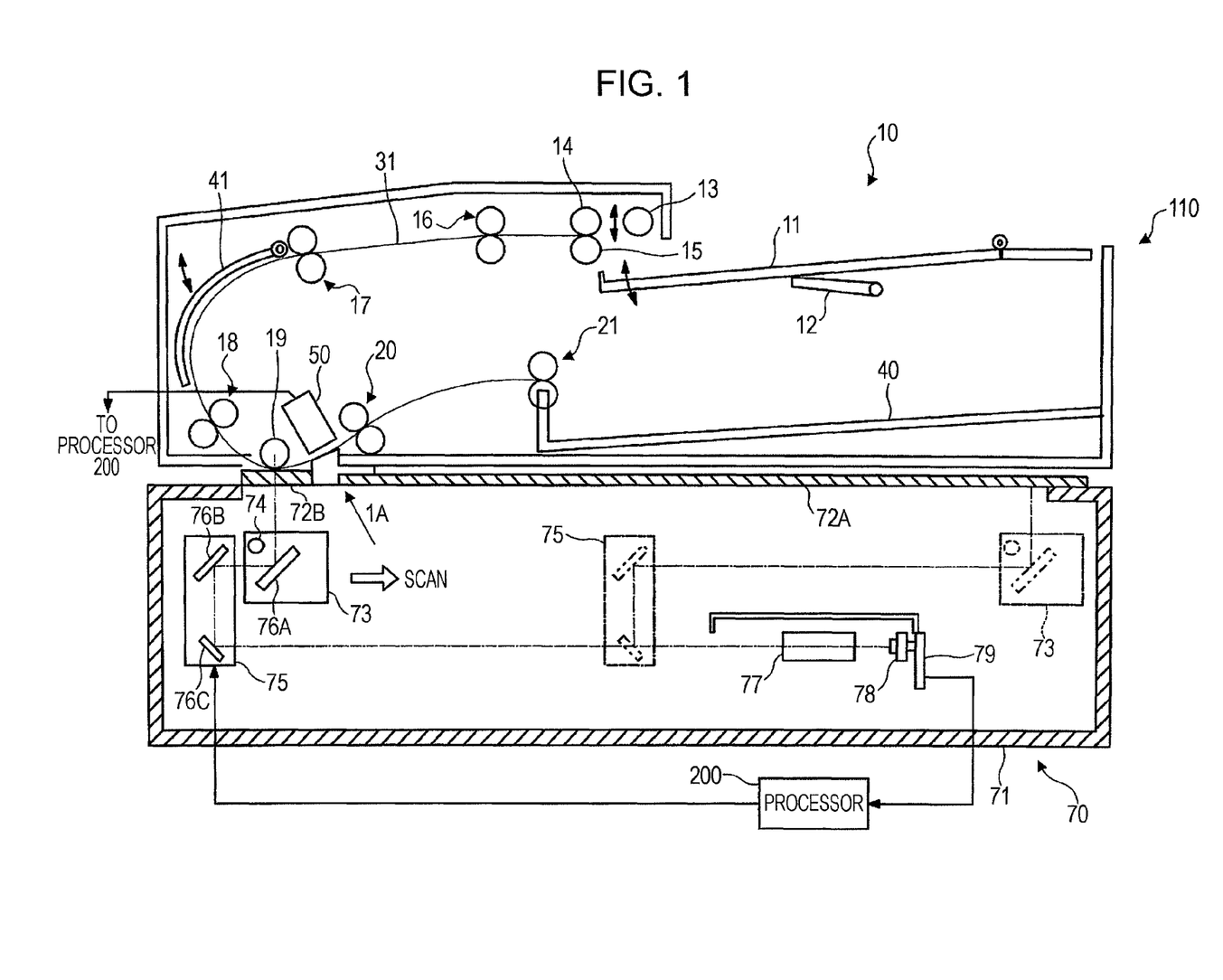
FIG. 1 illustrates an image reading apparatus according to a first exemplary embodiment.

FIG. 1 illustrates an image reading apparatus 110 according to a first exemplary embodiment. The image reading apparatus 110 includes a document feeder 10, a scanner 70, and a processor 200. The document feeder 10 successively transports documents one by one from a stack of documents. The scanner 70 scans and reads an image. The processor 200 processes the signal of the read image.

The document feeder 10 includes a first sheet stacker 11 and a lifter 12. A stack of documents is placed on the first sheet stacker 11. The lifter 12 lifts and lowers the first sheet stacker 11. The document feeder 10 further includes a transport roller 13, a feed roller 14, and a retard roller 15. The transport roller 13 transports the documents placed on the first sheet stacker 11 that has been lifted by the lifter 12. The feed roller 14 transports the documents, which have been transported by the transport roller 13, further downstream. The retard roller 15 separates the documents, which have been transported by the transport roller 13. Take-away rollers 16 and pre-registration rollers 17 are disposed in a document transport path 31 along which the document is transported. The take-away rollers 16 transport the separated document toward rollers that are disposed downstream. The pre-registration rollers 17 transport the document further downstream and causes the document to form a loop.

Registration rollers 18 are disposed in the document transport path 31. The registration rollers 18 temporarily stop and then restart rotation at an appropriate timing, and supply a document to a document reading section while performing registration adjustment. A platen roller 19 and outside rollers 20 are disposed in the document transport path 31. The platen roller 19 assists transportation of a document while the document is being read. The outside rollers 20 transport the read document further downstream. A baffle 41 is disposed in the document transport path 31. The baffle 41 rotates around a pivot in accordance with a looped shape of the transported document. An image reading unit 50 is disposed between the platen roller 19 and the outside rollers 20. The image reading unit 50 reads an image on a document. In the image reading apparatus 110 according to the present exemplary embodiment, the image reading unit 50 is disposed near a reading position of a document surface (reading position for a CCD image sensor 78 (described below)) in order to increase the document transport speed and to read images on both surfaces of the document at a high speed. In the image reading apparatus 110 according to the present exemplary embodiment, a second sheet stacker 40 and output rollers 21 are disposed downstream of the outside rollers 20. Documents that have been read are stacked on the second sheet stacker 40. The output rollers 21 output the documents onto the second sheet stacker 40.

In a standby state, the transport roller 13 is lifted and held in a retracted position. When transporting a document, the transport roller 13 is lowered to a nip position (document transport position) and transports the uppermost document on the first sheet stacker 11. The feed roller 14 transports the document, which has been transported by the transport roller 13, further downstream. The pre-registration rollers 17 causes the document to form a loop by pressing the leading end of the document against the registration rollers 18 that are not rotating. At the registration rollers 18, the leading end of the document, which has contacted the registration rollers 18 when forming the loop, is returned to a nip position. When the loop is formed, the baffle 41 rotates around the pivot so as not to prevent the document from forming the loop. The take-away rollers 16 and the pre-registration rollers 17 maintain the loop while the document is being read. Because the document forms the loop, the timing for reading the document is adjusted, and a skew of the document is suppressed.

An apparatus frame 71 of the scanner 70 supports the document feeder 10, and the scanner 70 reads an image of the document while the document is transported by the document feeder 10. The scanner 70 includes a first platen glass 72A and a second platen glass 72B, which are disposed on the apparatus frame 71. A document to be read is placed at rest on the first platen glass 72A. A light opening, through which an image of a document transported by the document feeder 10 is read, is formed in the second platen glass 72B. In the present exemplary embodiment, the document feeder 10 is configured to be rotatable around a pivot disposed in a rear part of the image reading apparatus 110. When setting a document on the first platen glass 72A, the document feeder 10 is rotated and moved upward around the pivot.

The scanner 70 includes a full rate carriage 73 that reads an image either while at rest under the second platen glass 72B or while scanning across the entire area of the first platen glass 72A. The scanner 70 includes a half rate carriage 75 that supplies light obtained from the full rate carriage 73 to an image forming section. The full rate carriage 73 includes an illumination lamp 74 and a first mirror 76A. The illumination lamp 74 irradiates a document with light. The first mirror 76A receives reflected light reflected from the document. The half rate carriage 75 includes a second mirror 76B and a third mirror 76C, which supply light obtained from the first mirror 76A to the image forming section. The scanner 70 includes an image forming lens 77 and the CCD (charge coupled device) image sensor 78. The image forming lens 77 optically reduces an optical image obtained from the third mirror 76C. The CCD image sensor 78 photoelectrically converts the optical image formed by the image forming lens 77. The scanner 70 includes a driver circuit board 79 that converts an analog image signal obtained by the CCD image sensor 78 into a digital image signal. The digital image signal is sent to the processor 200.

When reading an image of a document placed on the first platen glass 72A, the full rate carriage 73 and the half rate carriage 75 move by distances in the ratio of 2:1 in the scanning direction (indicated by an outline arrow). At this time, a surface of a document to be read is irradiated with light emitted by the illumination lamp 74 of the full rate carriage 73. Reflected light from the document is reflected by the first mirror 76A, the second mirror 76B, and the third mirror 76C in this order, and is guided to the image forming lens 77. The light guided to the image forming lens 77 forms an image on the light-receiving surface of the CCD image sensor 78. The CCD image sensor 78 is a one-dimensional sensor that reads one line at a time. The full rate carriage 73 reads one line (in the main scanning direction), moves in a direction (sub-scanning direction) perpendicular to the main scanning direction, and reads the next line of the document. One page of the document is read by repeating this operation over the entire size of the document.

A document transported by the document feeder 10 passes over the second platen glass 72B when the document is read. In this case, the full rate carriage 73 and the half rate carriage 75 are at rest at positions illustrated by solid lines in FIG. 1. Reflected light reflected by the first line of the document that has passed the platen roller 19 of the document feeder 10 is reflected by the first mirror 76A, the second mirror 76B, and the third mirror 76C. Then, the light is focused by the image forming lens 77, and the CCD image sensor 78 reads an image.

The CCD image sensor 78, which is a one-dimensional sensor, reads one line extending in the main scanning direction at a time. Then, the CCD image sensor reads the next one line extending in the main scanning direction of the document, which is transported by the document feeder 10. Subsequently, when the trailing end of the document passes the reading position of the second platen glass 72B, reading of one page in the sub-scanning direction is finished. In the present exemplary embodiment, when the CCD image sensor 78 reads a first surface of the document, the image reading unit 50 simultaneously reads a second surface of the document. This allows both surfaces of the document to be read without transporting the document plural times. Here, the term "simultaneously" does not mean a complete coincidence in time, but means "in the same document transportation cycle".

Figure 2:
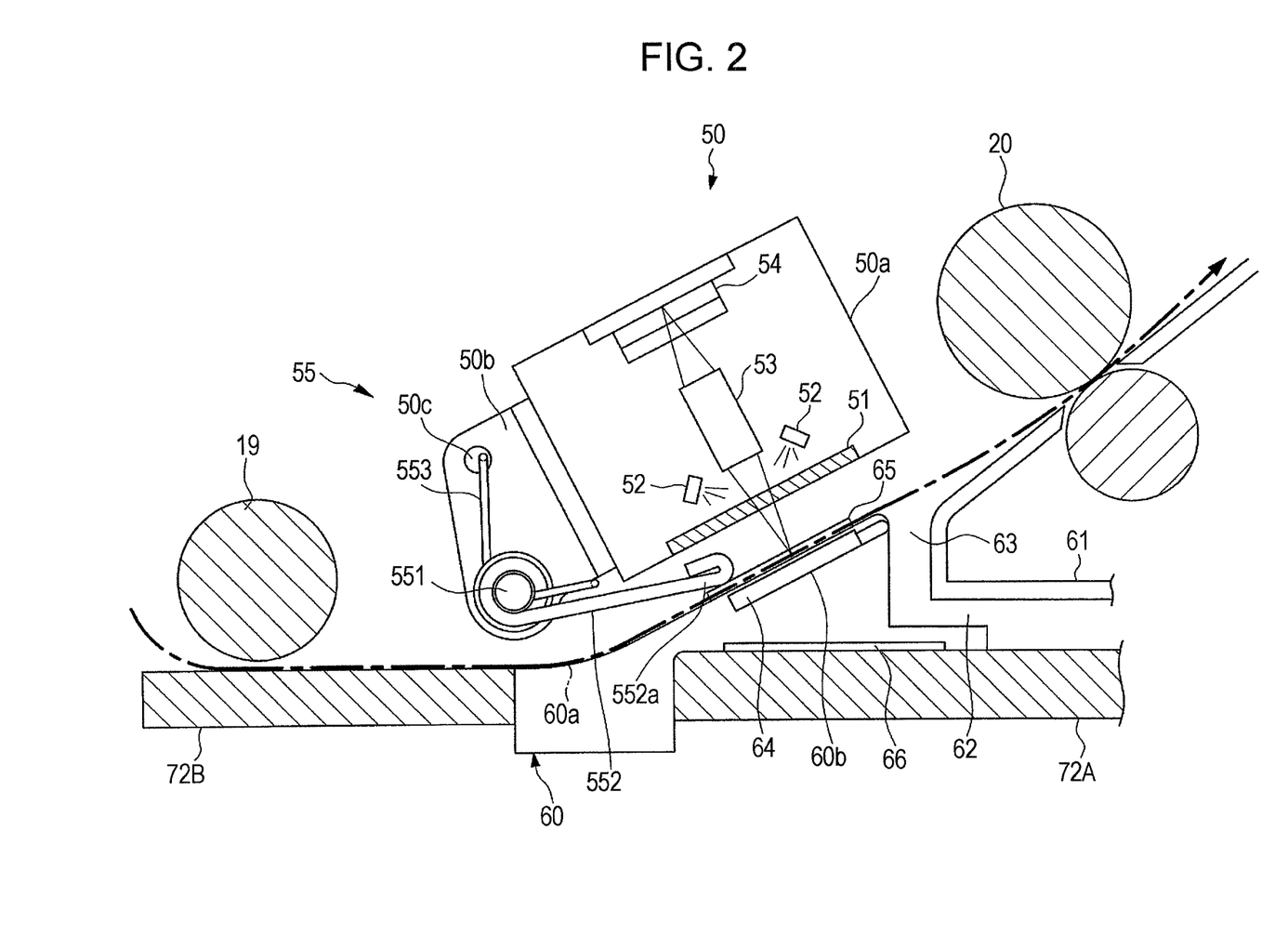
FIG. 2 illustrates an image reading unit.

FIG. 2 illustrates the image reading unit 50.

As illustrated in FIG. 2, the image reading unit 50, which is an example of an image reading member, is disposed between the platen roller 19 and the outside rollers 20. The image reading unit 50 has an oblong shape extending in a direction perpendicular to (intersecting) the document transport direction. To be specific, the image reading unit 50 extends from the front side to the rear side of the image reading apparatus 110. The first surface of the document is pressed against the second platen glass 72B, and the image of the first surface as described above is read by the CCD image sensor 78. The image of the second surface of the document is read by the image reading unit 50.

The image reading unit 50 includes a housing 50a, a glass member 51, and a light emitting diode (LED) 52. The housing 50a is open toward the document transport path. The glass member 51 is attached to the opening side the housing 50a. The LED 52, which is disposed in the housing 50a, irradiates the second surface of the document with light through the glass member 51. The image reading unit 50 includes a SELFOC lens (registered trademark) 53 that collects reflected light reflected from the document. The SELFOC lens is an example of a light-collecting member. The image reading unit 50 further includes a line sensor 54 that receives the light collected by the SELFOC lens 53 and that photoelectrically converts the light. An analog image signal obtained by the line sensor 54 is converted into a digital image signal and sent to the processor 200 (see FIG. 1).

The line sensor 54, which is an example of a light-receiving portion, is a sensor that is capable of reading an image having the same width as the sensor (for example, a length of 297 mm of an A4-sized sheet). The line sensor 54 may be a CCD sensor, a CMOS sensor, a contact image sensor, or the like. The image reading unit 50 captures an image by using the SELFOC lens 53 and the line sensor 54, without using a reducing optical system. Therefore, the image reading unit 50 has a simple structure. Moreover, the size the housing of the image reading unit 50 and the power consumption of the image forming unit 50 are reduced. To read a color image, a combination of LED light sources for three colors, i.e., R (red) G (green) B (blue) may be used as the LED 52. Alternatively, a white LED light source may be used and a three-row RGB color sensor may be used as the line sensor 54.

A pressing unit 55 (an example of a pressing member) is attached to the image reading unit 50. The pressing unit 55 presses a document toward the scanner 70 (an opposing member 60). The pressing unit 55 includes a base portion 50b that is attached to the housing 50a of the image reading unit 50. The base portion 50b is attached to one of the side surfaces of the housing 50a that is positioned on the upstream side in the document transport direction. The pressing unit 55 includes a guide member 552 that is attached to the base portion 50b and that extends downstream in the document transport direction. In the present exemplary embodiment, the pressing unit 55 is removably attached to the housing 50a of the image reading unit 50.

The scanner 70 (see FIG. 1) includes the opposing member 60 that is disposed at a position opposite the image reading unit 50 with the document transport path therebetween. To be specific, in the present exemplary embodiment, the image reading unit 50 is disposed in one of two regions that face each other with the document transport path therebetween, and the opposing member 60 is disposed in the other of the two regions. To be more specific, the image reading unit 50 is disposed on the document feeder 10 side, and the opposing member 60 is disposed on the scanner 70 side. In the present exemplary embodiment, a guide 61 is disposed downstream of the opposing member 60. An opening 63 is formed between the guide 61 and the opposing member 60. A dust retainer 62, for collecting dust generated due to documents, is disposed in a space that is below the guide 61 and continuous with the opening 63.

The guide member 552 is a plate-shaped member, and one end portion of the guide member 552 is wound around and supported by a rotation shaft 551 disposed in the base portion 50b, whereby the guide member 552 is rotatably supported by the rotation shaft 551. The other end portion of the guide member 552 is a free end that extends toward the opposing member 60. In the present exemplary embodiment, the image reading unit 50 includes a torsion spring 553. The torsion spring 553, which has two arms, is wound around the rotation shaft 551. The end of one of the arms is inserted into a through hole 50c formed in the base portion 50b, and the end of the other of the arms urges the guide member 552 toward the opposing member 60. The base portion 50b is formed at each end of the image reading unit 50, which extends in the depth direction of the image reading apparatus 110. The rotation shaft 551 and the torsion spring 553 are also disposed at each end.

The guide member 552 extends from the front side to the rear side in the depth direction of the image reading apparatus 110. In the present exemplary embodiment, the guide member 552 is made of a metal plate, such as a stainless steel plate. A bent portion 552a is formed at the free end of the guide member 552 by using a hemming process. The bent portion 552a contacts a document. In the present exemplary embodiment, the bent portion 552a is formed so as to prevent contact between a document and an edge of the guide member 552. In the present exemplary embodiment, the guide member 552 is made of a metal plate and configured to be twistable using the torsion spring 553, so that the thickness of a transported document is absorbed. Moreover, a document having a crease is stably transported.

The opposing member 60, which is an example of a document guide member, includes a document transport surface 60a and a stepped surface 60b. The document transport surface 60a, which guides a transported document, is disposed in an upstream portion of the opposing member 60 in the document transport direction. The stepped surface 60b is disposed in a downstream portion of the opposing member 60 in the document transport direction. The stepped portion 60b is formed at a level lower than that of the document transport surface 60a. The stepped surface 60b intersects with an extension line passing through the SELFOC lens 53 and the focal point of light collected by the SELFOC lens 53. A white reference tape 64, which is a biaxially oriented polyester film, is affixed to the stepped surface 60b. In the present exemplary embodiment, the upper surface of the white reference tape 64 is exposed toward the document transport path, and is located at a position slightly recessed from the upper surface of the document transport surface 60a (away from the transport path).

Ribs 65, which extend in the document transport direction, are formed on the transport path side (upper part) of the opposing member 60. The ribs 65 are formed at ends of the opposing member 60 in a direction perpendicular to the document transport direction. The ribs 65 are made of a resin and are integrally formed with the opposing member 60. In the present exemplary embodiment, the guide member 552 is urged by the torsion spring 553 and thereby pressed against the ribs 65. Thus, a gap corresponding to the height of the ribs 65 is formed between the guide member 552 and the document transport surface 60a of the opposing member 60. In the present exemplary embodiment, a white reference plate 66 is tightly attached to the upper surface of the first platen glass 72A at a position below the opposing member 60.

Although not described above, the image reading unit 50, which uses the SELFOC lens 53 as an optical image forming lens, has a depth of focus (depth of field) of about ±0.3 mm, which is as small as about 1/13 of that of the scanner 70. Therefore, when the image reading unit 50 reads a document, it is required that the document reading position be in a small range. To fulfill this requirement, the pressing unit 55 is provided in the present exemplary embodiment. The pressing unit 55 presses a transported document against the opposing member 60 to stabilize the position of the document that is located between the platen roller 19 and the outside rollers 20.

Figure 3:
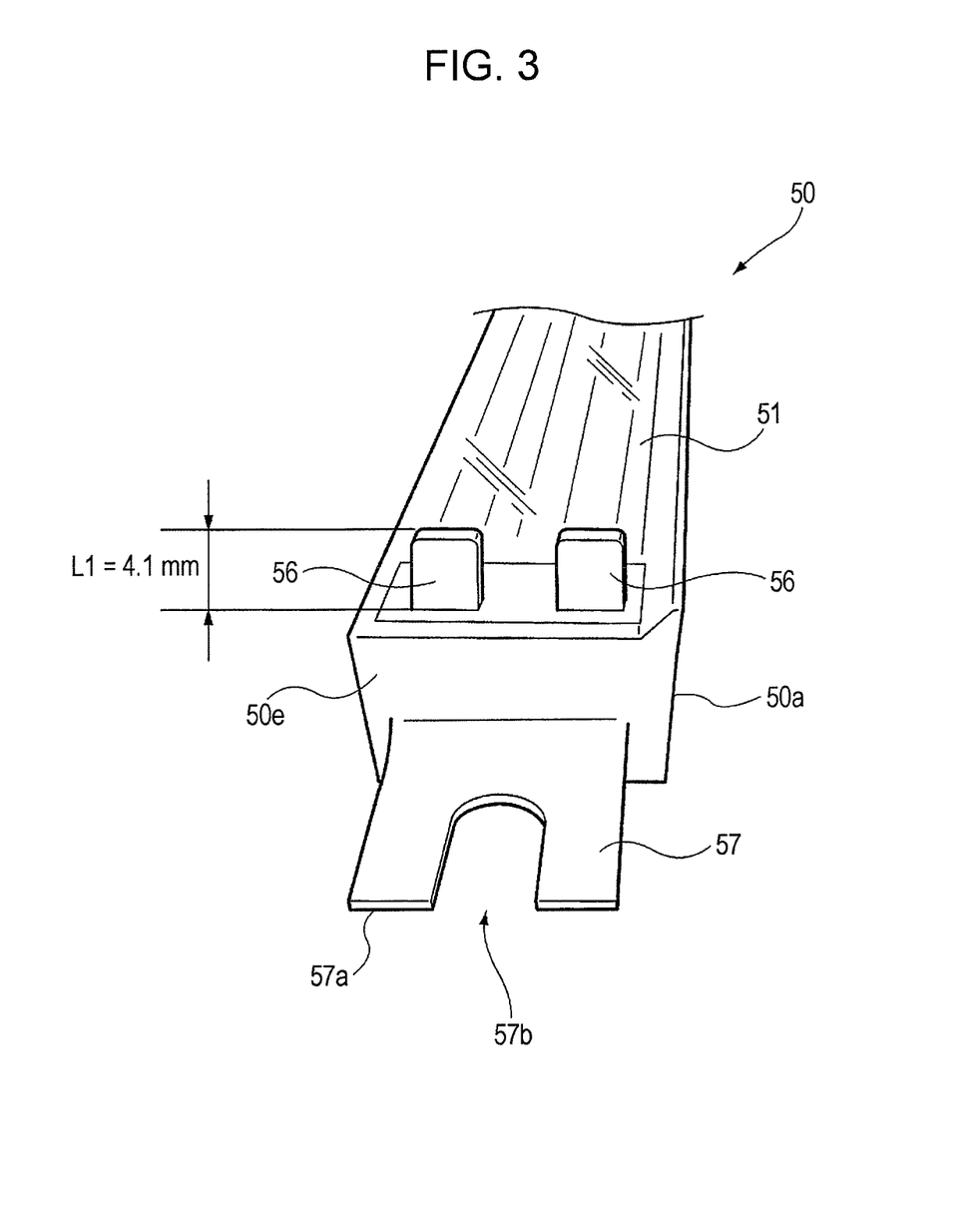
FIG. 3 is a perspective view of the image reading unit.

FIG. 3 is a perspective view of the image reading unit 50. In FIG. 3, the image reading unit 50 is illustrated upside down. FIG. 3 illustrates a part of the image reading unit 50 that is located on the rear side of the image reading apparatus 110 (on the distal side in FIG. 1).

As illustrated in FIG. 3, two projections 56 (an example of a protruding portion) are formed on one end portion of the image reading unit 50 in the longitudinal direction. The projections 56 protrude toward the document transport path, and are used for positioning the image reading unit 50. The length L1 (protruding length from the housing 50a) of the projections 56 is 4.1 mm. Although not illustrated, another projection 56 is formed on the other end portion of the image reading unit 50 in the longitudinal direction. In the present exemplary embodiment, positioning of the image reading unit 50 relative to the opposing member 60 is achieved by pressing the three projections 56 against the opposing member 60. Thus, variation in the distance between a transported document and the image reading unit 50 is reduced.

In the present exemplary embodiment, a protruding piece 57 protrudes from a side surface 50e of the housing 50a of the image reading unit 50 (side surface 50e positioned at each end of the image reading unit 50). The protruding piece 57 has an edge portion 57a and a U-shaped cutout 57b. The edge portion 57a is located away from the side surface 50e of the housing 50a. The cutout 57b is formed so as to extend from the edge portion 57a toward the side surface 50e. The image reading unit 50 is installed in the document feeder 10 (see FIG. 1) by placing the image reading unit 50 into the document feeder 10 from a side of the document feeder 10 that faces the scanner 70. That is, the image reading unit 50 is installed in the document feeder 10 by placing the image reading unit 50 into the document feeder 10 in the direction of an arrow 1A in FIG. 1.

In the present exemplary embodiment, when installing the image reading unit 50, a positioning projection (not shown) that is formed on the document feeder 10 enters the cutout 57b. In the present exemplary embodiment, positioning of the image reading unit 50 is achieved by making the projection enter the cutout 57b. To be specific, positioning in the document transport direction is achieved. Alternatively, positioning of the image reading unit 50 may be performed by forming an elongated hole or a round hole in the protruding piece 57 and by inserting the positioning projection into the elongated hole or the round hole. In this case, installation of the image reading unit 50 in a second image reading apparatus, which will be described below, becomes difficult. Moreover, it is difficult to achieve commonality of the image reading unit 50 (described below in detail). Therefore, in the present exemplary embodiment, instead of an elongated hole or a round hole, the cutout 57b, which is open toward the edge portion 57a, is formed in the protruding piece 57.

Figure 4:
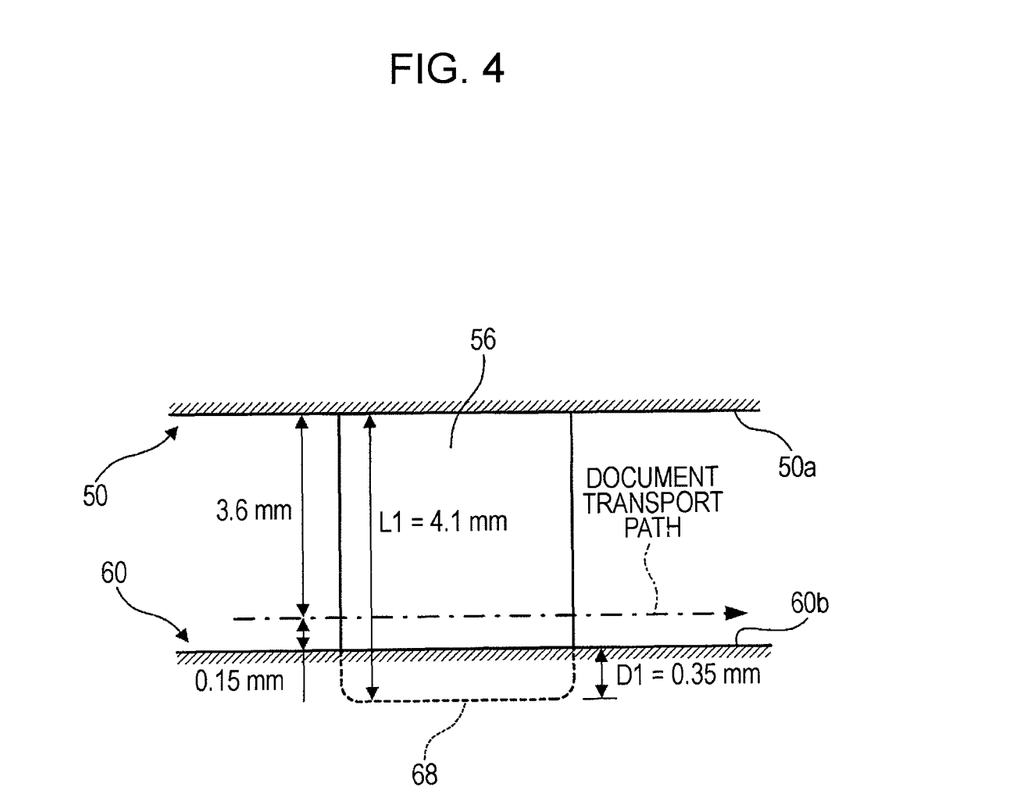
FIG. 4 is an enlarged view of a part of an opposing member that supports a projection.

FIG. 4 is an enlarged view of a part of the opposing member 60 that supports the projection 56.

Although not described above, a recess 68 (an example of a first recess) is formed in the stepped surface 60b (see also FIG. 2), which is formed on the opposing member 60, and on the rear side of the image reading apparatus 110. The recess 68 allows the projection 56 formed on the image reading unit 50 to enter thereinto. In the present exemplary embodiment, positioning of the image reading unit 50 is more accurately performed because the projection 56 enters the recess 68. The part of the opposing member 60 in which the recess 68 is formed is an example of a restraining portion that restrains movement of the projection 56, which functions as a protruding portion. Although not illustrated, in the present exemplary embodiment, a recess (an example of a second recess) is formed on the front side (proximal side) of the image reading apparatus 110. The recess allows the projection 56 (not shown) formed in the other end portion of the image reading unit 50 to enter thereinto.

As described above, in the present exemplary embodiment, the positioning projection (not shown) formed on the image reading apparatus 110 enters the cutout 57b (see FIG. 3), whereby positioning of the image reading unit 50 is performed. In the present exemplary embodiment, in addition to this positioning, positioning is further performed by using the recesses 68 and the projections 56. By thus performing additional positioning by using the recesses 68 and the projections 56, vibration and displacement of the image reading unit 50 are more effectively reduced. In the present exemplary embodiment, as illustrated in FIG. 2, the stepped surface 60b is inclined. Therefore, by positioning of the image reading unit 50 by making the projections 56 enter the recesses 68, displacement of the image reading unit 50 is further reduced.

In the present exemplary embodiment, as illustrated in FIG. 4, a document passes a position that is 0.15 mm away from the stepped surface 60b. To be specific, the stepped surface 60b is located below the document transport surface 60a (see FIG. 2) that guides a document, so that the document passes above the stepped surface 60b. In the present exemplary embodiment, the distance between the focal point of light formed by the SELFOC lens 53 and the lower surface of the image reading unit 50 is 3.6 mm. As described above, the length L1 of the projection 56 is 4.1 mm. Therefore, in the present exemplary embodiment, the depth D1 of the recess 68 is set at 0.35 mm, so that the focal point is on the document transport path.

Figure 5:
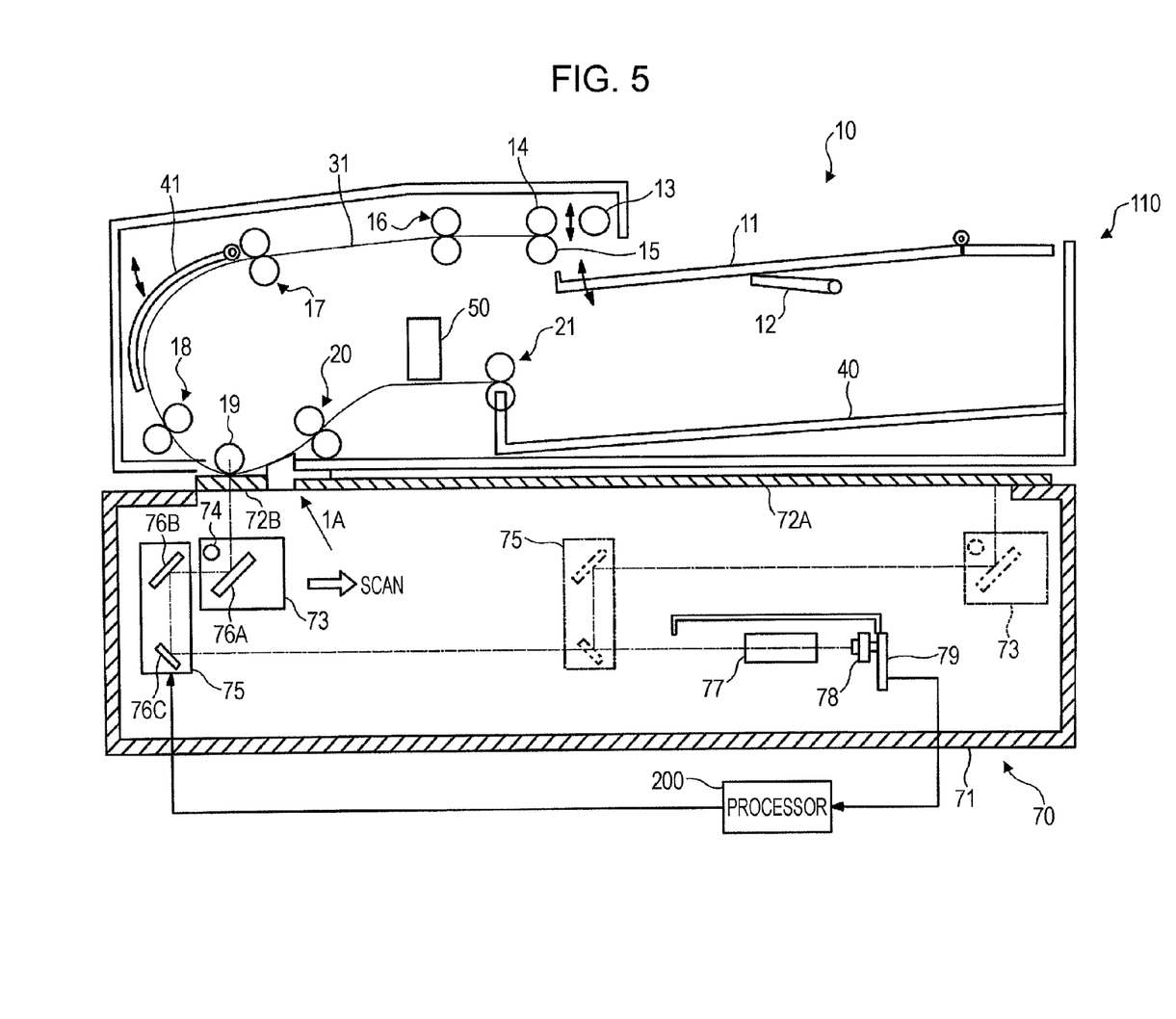
FIG. 5 illustrates an image reading apparatus according to a second exemplary embodiment.

FIG. 5 illustrates an image reading apparatus according to a second exemplary embodiment. The members the same as those of the first embodiment will be denoted by the same numerals and the description thereof will be omitted. In the description below, the image reading apparatus 110 illustrated in FIG. 1 will be referred to as a first image reading apparatus 110, and the image reading apparatus 110 illustrated in FIG. 5 will be referred to as a second image reading apparatus 110.

In the first image reading apparatus 110 illustrated in FIG. 1, the image reading unit 50 is disposed between the platen roller 19 and the outside rollers 20. As illustrated in FIG. 5, the image reading unit 50 may be disposed between the outside rollers 20 and the output rollers 21. In the present exemplary embodiment, the image reading unit 50 is used in common. The image reading unit 50 illustrated in FIGS. 1 to 3 is installed in the second image reading apparatus 110 illustrated in FIG. 5. The second image reading apparatus 110 transports a document with an intermediate speed. In the second image reading apparatus 110, the image reading unit 50 is disposed at a position away from the image reading position at which the first surface of the document is read (image reading position for the CCD image sensor 78).

Figure 6:
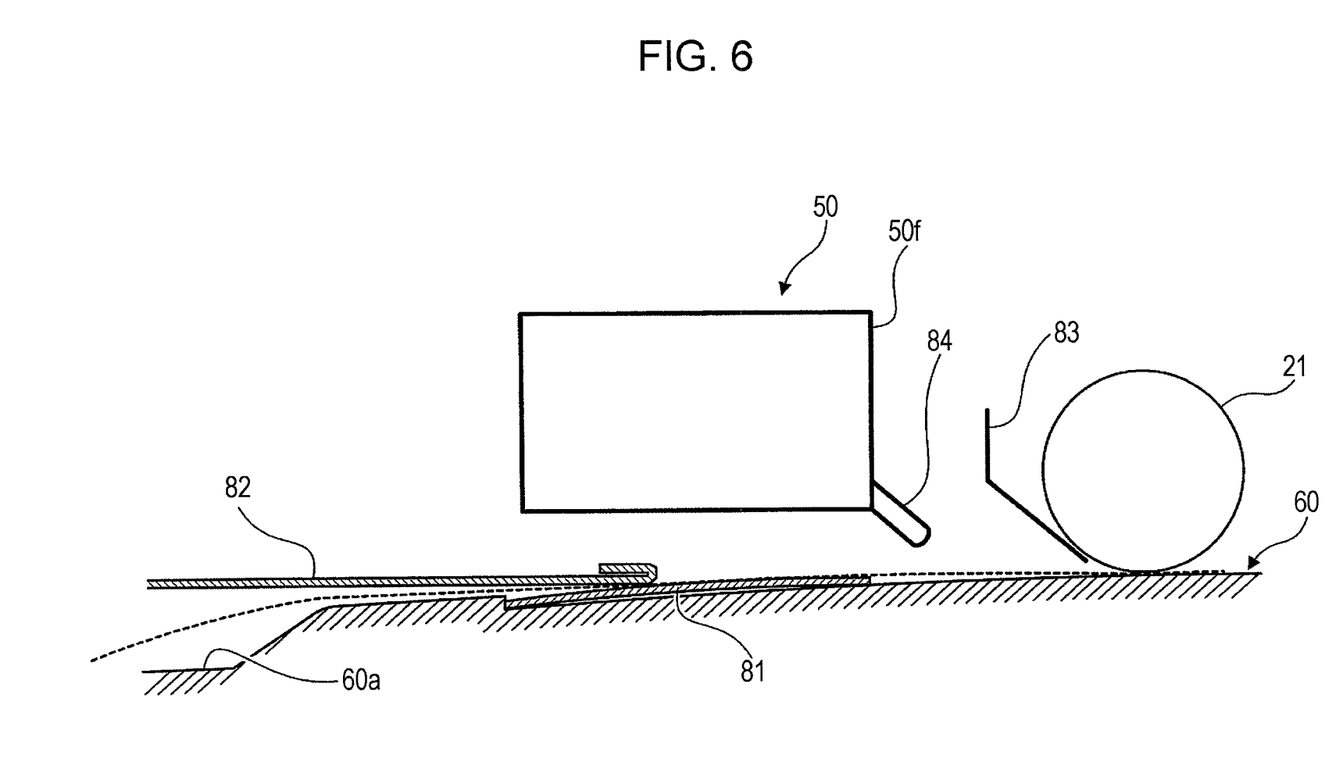
FIG. 6 is an enlarged view of a part of the image reading apparatus illustrated in FIG. 5 in which an image reading unit is installed.

FIG. 6 is an enlarged view of a part of the second image reading apparatus 110 illustrated in FIG. 5 in which the image reading unit 50 is installed.

As in the case described above, in the second image reading apparatus 110, the opposing member 60 is disposed at a position opposite the image reading unit 50 with the document transport path therebetween. As in the case described above, the opposing member 60 has the document transport surface 60a that guides a transported document. A first guide member 81 that guides the transported document is provided in the present exemplary embodiment. The first guide member 81 has a plate-like shape, and is disposed on a portion of the document transport surface 60a that faces the image reading unit 50.

A second guide member 82, which guides the transported document, is provided so as to face the first guide member 81 and the document transport surface 60a. As illustrated by a broken line in FIG. 6, the document passes between the second guide member 82 and the document transport surface 60a and between the second guide member 82 and the first guide member 81. In the present exemplary embodiment, the second guide member 82 presses the document against the opposing member 60. Therefore, the pressing unit 55 (see FIG. 2) is not included in the image reading unit 50 illustrated in FIG. 6.

As illustrated in FIG. 6, the second image reading apparatus 110 includes a third guide member 83 that is disposed upstream of the output rollers 21 in the document transport direction. The third guide member 83 guides the transported document toward the document transport surface 60a. A guide portion 84 for guiding the transported document is disposed on a side surface 50f (a side surface located on the downstream side in the document transport direction) of the housing 50a of the image reading unit 50.

Installation of the image reading unit 50 in the second image reading apparatus 110 will be described. The image reading unit 50 is installed in the second image reading apparatus 110 by inserting the image reading unit 50 into the document feeder 10 from the front side of the second image reading apparatus 110 (proximal side of the plane of FIG. 5). In the present exemplary embodiment, when this insertion is performed, a positioning projection (not shown) formed on the second image reading apparatus 110 enters the cutout 57b (see FIG. 3). In the present exemplary embodiment, positioning of the image reading unit 50 is achieved by making the positioning projection enter the cutout 57b. To be specific, positioning in the document transport direction is achieved.

As described above, in the case of the first image reading apparatus 110, the image reading unit 50 is placed into the document feeder 10 from a side of the document feeder 10 that faces the scanner 70 (see the arrow 1A in FIG. 1). Therefore, attaching (positioning) of the image reading unit 50 may performed by using an elongated hole or a round hole formed in the protruding piece 57. However, in the case of the second image reading apparatus 110, the image reading unit 50 is installed by inserting the image reading unit 50 as described above. Therefore, even if an elongated hole or a round hole is formed in the protruding piece 57, it is difficult to align the positioning projection with the elongated hole or the round hole. Therefore, as described above, instead of an elongated hole or a round hole, the cutout 57b, which is open toward the edge portion 57a side (see FIG. 3), is formed in the protruding piece 57. In this case, the image reading unit 50 of the same type may be installed in any of the first image reading apparatus 110 and the second image reading apparatus 110, whereby commonality of the image reading unit 50 is achieved.

Figure 7:
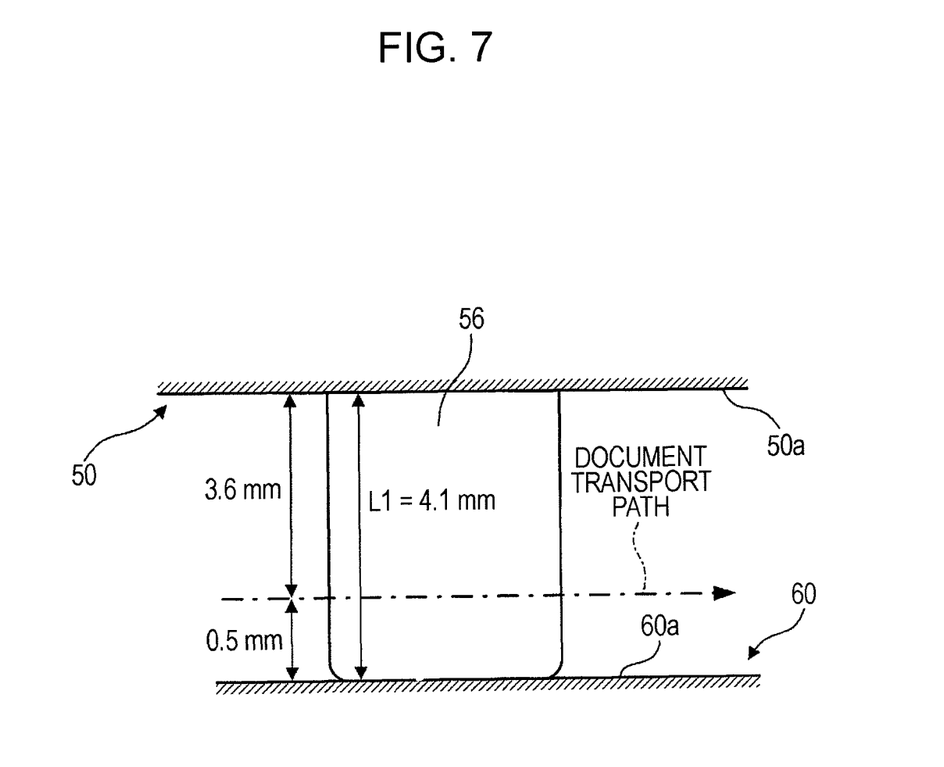
FIG. 7 is an enlarged view of a part of an opposing member illustrated in FIG. 6 that supports a projection.

FIG. 7 is an enlarged view of a part of the opposing member 60 illustrated in FIG. 6 that supports the projection 56.

In the second image reading apparatus 110, the projection 56 contacts the document transport surface 60*a*, and the document transport surface 60*a* supports the projection 56. In the second image reading apparatus 110, the first guide member 81 (see FIG. 6) is disposed on the document transport surface 60*a*, so that a document passes a position away from the document transport surface 60*a*. To be specific, the document passes a position that is 0.5 mm away from the document transport surface 60*a*. As described above, the distance between the focal point of light formed by the SELFOC lens 53 and the lower surface of the image reading unit 50 is 3.6 mm. As described above, the length L1 of the projection 56 is 4.1 mm. Therefore, in the present exemplary embodiment, the focal point is on the document transport path even when the recess 68 described above (see FIG. 4) is not formed.

The distance between a contact surface that the projection 56 contacts and the document transport path differs between the case of the first image reading apparatus 110 and the case of the second image reading apparatus 110. To be specific, the position that the document passes in the first image reading apparatus 110 differs from that in the second image reading apparatus 110. Therefore, if the image reading unit 50 is simply installed, the focal point of light formed by the SELFOC lens 53 may be deviated from the document transport path of at least one of the first image reading apparatus 110 and the second image reading apparatus 110. In this case, it is difficult to achieve commonality of the image reading unit 50.

Therefore, in the first exemplary embodiment, as illustrated in FIG. 4, the recess 68 is formed in the opposing member 60 of the first image reading apparatus 110, and the projection 56 is made to enter the recess 68. Thus, deviation of the focal point of light formed by the SELFOC lens 53 from the document transport path is reduced. In this case, the image reading unit 50 of the same type may be used in both of the first image reading apparatus 110 and the second image reading apparatus 110. That is, commonality of the image reading unit 50 is achieved.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   an image reading member disposed in one of two regions that face each other with a transport path of a document therebetween, the image reading member being used for reading an image on the document, the image reading member including a light-receiving portion, a light-collecting member that collects reflected light reflected from the document onto the light-receiving portion, and a protruding portion that protrudes toward the transport path; and
   an opposing member disposed in the other of the two regions, the opposing member having a recess formed therein, the recess allowing the protruding portion of the image reading member to enter thereinto, the opposing member being disposed opposite the image reading member with the transport path therebetween.

2. The image reading apparatus according to claim 1, wherein a pressing member is removably attached to the image reading member, the pressing member pressing the document against the opposing member while the document is being transported along the transport path.

3. The image reading apparatus according to claim 1, wherein the opposing member has an inclined surface formed on a portion thereof that faces the protruding portion, and
wherein the recess is formed in the inclined surface.

4. The image reading apparatus according to claim 2, wherein the opposing member has an inclined surface formed on a portion thereof that faces the protruding portion, and
wherein the recess is formed in the inclined surface.

5. The image reading apparatus according to claim 1, wherein the image reading member has an oblong shape, wherein the protruding portion is formed on each of one end and the other end of the image reading member in the longitudinal direction, and
wherein, at least a first recess and a second recess, each being the recess, are formed in the opposing member, the first recess allowing the protruding portion formed on the one end of the image reading member to enter thereinto, the second recess allowing the protruding portion formed on the other end to enter thereinto.

6. The image reading apparatus according to claim 2, wherein the image reading member has an oblong shape, wherein the protruding portion is formed on each of one end and the other end of the image reading member in the longitudinal direction, and
wherein, at least a first recess and a second recess, each being the recess, are formed in the opposing member, the first recess allowing the protruding portion formed on the one end of the image reading member to enter thereinto, the second recess allowing the protruding portion formed on the other end to enter thereinto.

7. The image reading apparatus according to claim 3, wherein the image reading member has an oblong shape, wherein the protruding portion is formed on each of one end and the other end of the image reading member in the longitudinal direction, and
wherein, at least a first recess and a second recess, each being the recess, are formed in the opposing member, the first recess allowing the protruding portion formed on the one end of the image reading member to enter thereinto, the second recess allowing the protruding portion formed on the other end to enter thereinto.

8. The image reading apparatus according to claim 4, wherein the image reading member has an oblong shape, wherein the protruding portion is formed on each of one end and the other end of the image reading member in the longitudinal direction, and
wherein, at least a first recess and a second recess, each being the recess, are formed in the opposing member, the first recess allowing the protruding portion formed on the one end of the image reading member to enter thereinto, the second recess allowing the protruding portion formed on the other end to enter thereinto.

9. The image reading apparatus according to claim 1, wherein the depth of the recess is set such that the focal point of the light-collecting member is positioned on the transport path.

10. The image reading apparatus according to claim 2, wherein the depth of the recess is set such that the focal point of the light-collecting member is positioned on the transport path.

11. The image reading apparatus according to claim 3, wherein the depth of the recess is set such that the focal point of the light-collecting member is positioned on the transport path.

12. The image reading apparatus according to claim 4, wherein the depth of the recess is set such that the focal point of the light-collecting member is positioned on the transport path.

13. The image reading apparatus according to claim 5, wherein the depth of the recess is set such that the focal point of the light-collecting member is positioned on the transport path.

14. The image reading apparatus according to claim 6, wherein the depth of the recess is set such that the focal point of the light-collecting member is positioned on the transport path.

15. The image reading apparatus according to claim 7, wherein the depth of the recess is set such that the focal point of the light-collecting member is positioned on the transport path.

16. The image reading apparatus according to claim 8, wherein the depth of the recess is set such that the focal point of the light-collecting member is positioned on the transport path.

17. An image reading apparatus comprising:

an image reading member disposed in one of two regions that face each other with a transport path of a document therebetween, the image reading member being used for reading an image on the document, the image reading member including a light-receiving portion, a light-collecting member that collects reflected light reflected from the document onto the light-receiving portion, and a protruding portion that protrudes toward the transport path; and a document guide member disposed in the other of the two regions, the document guide member guiding the document that is transported along the transport path, the document guide member including a restraining portion that restrains movement of the protruding portion of the image reading member.

\* \* \* \* \*